(12) United States Patent
Herzi et al.

(10) Patent No.: US 6,353,885 B1
(45) Date of Patent: Mar. 5, 2002

(54) SYSTEM AND METHOD FOR PROVIDING BIOS-LEVEL USER CONFIGURATION OF A COMPUTER SYSTEM

(75) Inventors: Dirie Herzi, Austin; Jim Dailey, Round Rock, both of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/237,743

(22) Filed: Jan. 26, 1999

(51) Int. Cl.$^7$ .............................................. G06F 15/177
(52) U.S. Cl. ................................................... 713/1; 713/2
(58) Field of Search ................................. 713/1, 2, 100

(56) References Cited

U.S. PATENT DOCUMENTS

| | | |
|---|---|---|
| 5,230,059 A | 7/1993 | Nielsen et al. |
| 5,535,321 A | 7/1996 | Massaro et al. |
| 5,579,529 A | 11/1996 | Terrell et al. |
| 5,617,565 A | 4/1997 | Augenbraun et al. |
| 5,638,497 A | 6/1997 | Kimber et al. |
| 5,710,884 A | 1/1998 | Dedrick |
| 5,892,902 A * | 4/1999 | Clark .......................... 713/201 |
| 5,954,808 A * | 9/1999 | Paul ............................ 710/104 |
| 5,991,875 A * | 11/1999 | Paul ............................... 713/2 |
| 6,154,836 A * | 11/2000 | Dawson, III et al. ............ 713/1 |
| 6,177,860 B1 * | 1/2001 | Cromer et al. ............. 340/10.1 |

* cited by examiner

Primary Examiner—Dennis M. Butler
(74) Attorney, Agent, or Firm—Haynes and Boone, LLP

(57) ABSTRACT

A computer system having capability for implementing BIOS level configuration settings includes at least one processor, at least one memory, basic input output system (BIOS) firmware, and at least one BIOS configurable device. The at least one memory includes operating system code. The BIOS firmware includes a smart card BIOS level setting support feature. The BIOS configurable device is subject to being configured by the at least one processor in response to a prescribed smart card actuation of the smart card BIOS level setting support feature prior to a booting of the operating system code.

32 Claims, 1 Drawing Sheet

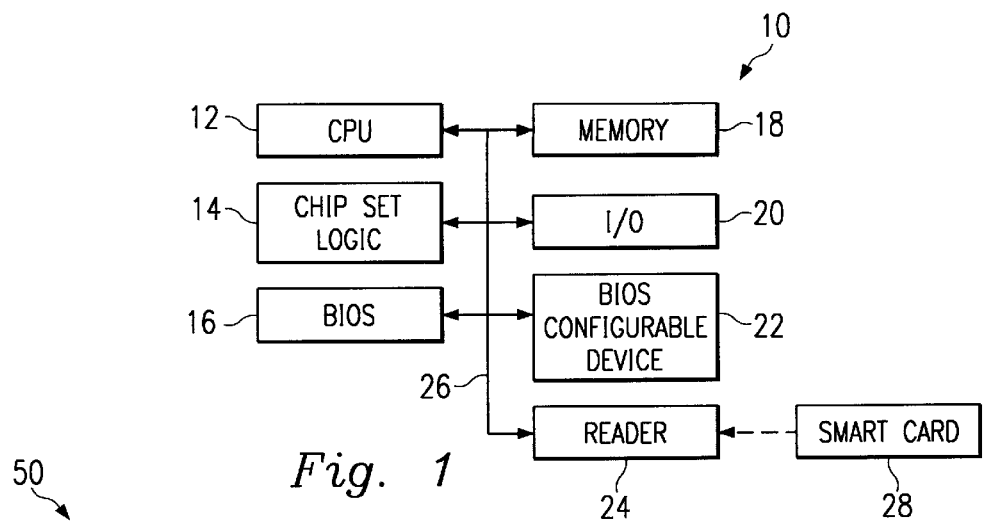
Fig. 1
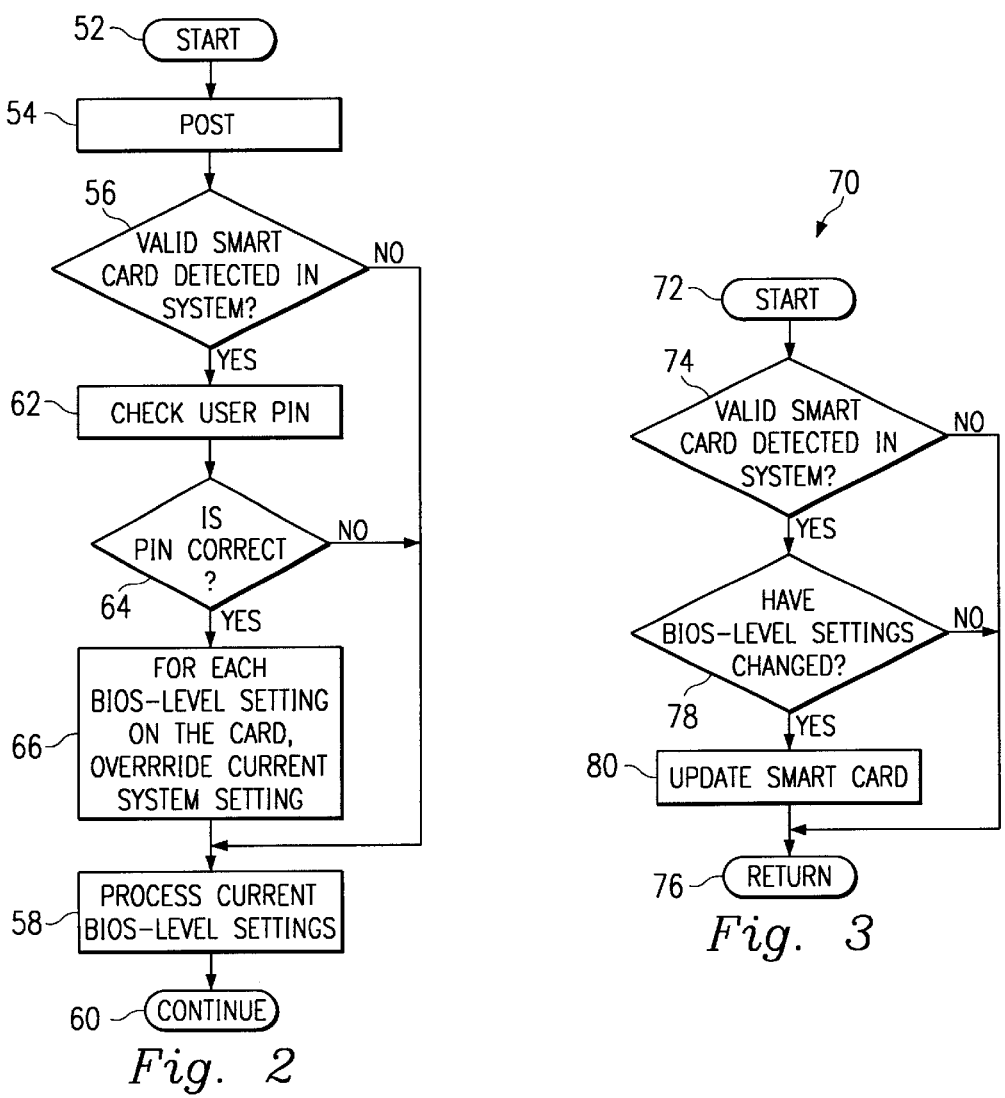
Fig. 2
Fig. 3

SYSTEM AND METHOD FOR PROVIDING BIOS-LEVEL USER CONFIGURATION OF A COMPUTER SYSTEM

BACKGROUND

The disclosures herein relate generally to computer systems, and more particularly, to user configuration of a computer system in a multi-user environment.

Current corporate environment for computer system usage includes the assigning of employees to a specific office location when the employees arrive to work on a day-to-day basis. On any given day, one cannot predict which office any one employee will occupy. Some of these employees may be required to use computer systems that do not move from office to office. In such an environment, where users share computer systems, the computer system user's preferences for BIOS-level settings are not always honored because the settings are typically stored in system memory which is part of a given computer system. If one modifies the BIOS-level settings on a computer system, future users of that system will have to accept the settings or manually modify the settings to their own preference.

Some parts of the BIOS-level settings (e.g., CMOS contents) currently may be saved and restored manually by having the computer user execute certain utility software. The utility software would have to be run on every machine a particular user would use. Note that the first time a user were to use a given computer system, there would be no settings saved on the computer system. In such a case, the computer system user would have to manually make all the desired changes and then save the changes on the given computer system.

In addition, in currently available computer systems, BIOS level settings are generally stored in a prescribed location within the computer system. Under normal usage, the location is a secure location. The BIOS level settings typically maintain their integrity from use to use by a computer user. BIOS level settings however are subject to being altered or corrupted. For example, the CMOS memory for storing the BIOS level settings may get corrupted or the settings may get corrupted by faulty software. In the event that the BIOS level settings are corrupted, the settings can typically be restored to some pre-established default settings. Exemplary BIOS level settings may include device boot order, serial port settings, interrupt settings, power management settings, and other similar type settings. The BIOS level settings can further include prescribed factory settings and user modified settings which are different from the factory settings.

BIOS level settings can typically be modified by accessing a BIOS set-up screen on the computer system. At the BIOS set-up screen, the settings can be changed by a user. Further with respect to a multi-user environment, consider a situation in which a boot device order setting has been changed or modified by a first computer user, the boot device order being different from a boot device order setting desired by a second computer user. The first user may desire for the computer system to boot from the floppy disk drive and the second user may wish to boot from a portable external media bay drive which the second user carries around. The second user would not be able to boot from the given computer system, since the BIOS level setting is set to boot from the floppy disk drive by the first user. A failure of the computer system would occur in such an instance, that is, in the event that the first user modified the BIOS level settings as noted, further without changing the settings back to the original or default settings. The second user would be unable to boot from the external media bay drive.

It would thus be desirable to have an improved system and method for providing BIOS-level user configuration in a multi-user computer system environment.

SUMMARY

According to one embodiment, a computer system having capability for implementing BIOS level configuration settings includes at least one processor, at least one memory, basic input output system (BIOS) firmware, and at least one BIOS configurable device. The at least one memory includes operating system code. The BIOS firmware includes a smart card BIOS level setting support feature. The BIOS configurable device is subject to being configured by the at least one processor in response to a prescribed smart card actuation of the smart card BIOS level setting support feature prior to a booting of the operating system code.

The embodiments of the present disclosure advantageously provide an improved system and method for providing BIOS-level user configuration in a multi-user computer system environment.

BRIEF DESCRIPTION OF THE DRAWINGS

The foregoing and other teachings and advantages of the present invention will become more apparent upon a detailed description of the best mode for carrying out the invention as rendered below. In the description to follow, reference will be made to the accompanying drawings, in which:

FIG. 1 illustrates a block diagram of a computer system illustrative of one embodiment of the present disclosure;

FIG. 2 is a flow diagram of a method for implementing BIOS level configuration settings of computer system according to an embodiment of the present disclosure; and FIG. 3 illustrates an exemplary flow diagram of an updating of a prescribed smart card with BIOS level configuration settings according to an embodiment of the present disclosure.

DETAILED DESCRIPTION OF THE PREFERRED EMBODIMENT

Referring now to FIG. 1, a system block diagram of a computer system 10 configured in accordance the present embodiments as discussed herein. The computer system 10 includes a central processing unit (CPU) 12, chip set logic 14, basic input output system (BIOS) firmware 16, memory, such as RAM, ROM, and other memory devices, collectively designated by reference numeral 18, input/output (I/O) devices, such as a display, a keyboard, a mouse, and associated controllers, collectively designated by a reference numeral 20, at least one BIOS configurable device designated by reference numeral 22, a reader device, such as a smart card reader 24, all interconnected via one or more buses, shown collectively in FIG. 1 as a bus 26. Reader 24 may include a PCMIA smart card reader or other suitable reader. Reader 24 may also be connected to computer system 10 via a serial port or a universal serial bus (USB). Computer system 10 may further include other storage devices (not shown), such as a floppy disk drive, CD-rom drive, and other memory devices, and various other subsystems, such as a network interface card (or NIC).

With reference still to FIG. 1, a smart card 28 is provided for use in connection with computer system 10, as will be discussed further herein below. Smart card 28 may include a smart card such as commercially available from Schlumberger of Austin, Tex. or Gemplus of Redwood City, Calif., the smart card having been modified for performing prescribed functions as discussed herein.

The BIOS configurable device 22 of computer system 10 may include, for example, a diskette drive, hard disk drive, removable hard disk drive, CD-ROM drive, network interface card (NIC), audio chip, sound card, etc. The BIOS configurable device may further include a chip on the computer system mother board, a card attached to a suitable computer system bus, a bus expansion card, a PCMCIA controller, or other externally connected BIOS configurable device.

The computer system also includes BIOS configurable devices which generate interrupt requests, IRQs. For instance, an audio sound card device generally requires the use of an interrupt or IRQ, wherein the specific IRQ is established with the use of a BIOS level setting. If a device of the computer system is not to be enabled for whatever reason, then the BIOS level settings may be used to hide the particular device, i.e., not enable the device. The computer's operating system would then not allocate an IRQ to the non-enabled device, nor give the non-enabled device any resources. In this manner, the resources, such as IRQs, are freed up to be used in other ways as may be necessary.

Further with respect to BIOS configurable devices and an audio sound card or chip, the sound card or chip may have both full duplex and half duplex capability. In the instance of a sound chip, the chip can be mounted on a mother board with the processor. For a sound card, the sound card can be attached to an appropriate bus of the computer system. For the full duplex capability, such as for a speaker phone application which allows simultaneous talking and listening, two IRQs are required. For the half duplex capability, one IRQ is required. As mentioned, the audio sound chip or card is a BIOS configurable device. The sound card can be easily configured for a desired use between multiple users as necessary with the use of the BIOS level setting smart card of the present disclosures. In some instances, full duplex mode may be desired. In other instances, half duplex mode may be sufficient. Thus, by enabling half duplex mode when possible, an IRQ is freed up for use by another device of the computer system which may require an IRQ. More efficient usage of the computer system resources is thus accomplished.

According to one embodiment, computer system 10 includes processor 12, memory 18, basic input output system (BIOS) firmware 16, and at least one BIOS configurable device 22. The BIOS firmware 16 includes a smart card BIOS level setting support feature. Memory 18 includes operating system code, the operating system code obtained from a storage device, such as a hard disk drive, subsequent to a booting of the computer system. The BIOS configurable device 22 is subject to being configured by processor 12 in response to a prescribed smart card 28 actuation of the smart card BIOS level setting support feature. Smart card reader 24 is provided for receiving a prescribed smart card 28. Smart card reader 24 interfaces the prescribed smart card 28 received therein with processor 12 in an actuation of the smart card BIOS level setting support feature. Processor 12 performs a BIOS level configuration setting of the at least one BIOS configurable device 22 prior to a booting of the operating system code.

According to one embodiment, the BIOS firmware 16 further includes a user accessible BIOS configuration setup feature, the setup feature including user selectable BIOS level settings. In addition, the at least one BIOS configurable device 22 is configurable by processor 12 in response to BIOS level settings selected by a user in accordance with the BIOS configuration setup feature. The smart card BIOS level setting support feature includes instructions for enabling processor 12 to perform an updating of the BIOS level settings on the prescribed smart card 24 subsequent to a change in the BIOS level settings of the at least one BIOS configurable device 22 by the user.

BIOS firmware 16 includes a factory default set of BIOS level settings for use in establishing a default setting of the at least one BIOS configurable device 22. In addition the prescribed smart card 28 includes a default smart card set of BIOS level settings for use in establishing a default smart card setting of the at least one BIOS configurable device 22. In one embodiment, the factory default set of BIOS level settings is the same as the smart card default set of BIOS level settings. In another embodiment, the factory default set of BIOS level settings is different from the smart card default set of BIOS level settings.

According to the embodiments of the present disclosure, a BIOS capability is provided for detecting the presence of a prescribed computer system configuration smart card in a computer system during a boot up process of the computer system. The BIOS is allowed to use information on the smart card to override corresponding BIOS-level settings. BIOS-level settings to be overridden may includes CMOS configuration and boot-level passwords. If a prescribed smart card is not detected, then the BIOS makes use of the current CMOS and password settings in the computer system.

Implementation of the present embodiments is accomplished by adding appropriate programming code to the setup interface to enable any changes to the BIOS-level settings to be saved on the prescribed BIOS-level settings smart card. In this manner, the user configured BIOS-level settings will be available for use on another computer system having smart card BIOS-level user configuration capability.

The present BIOS-level setting smart card enables a computer user to carry CMOS configuration and boot-level password information with them. The computer user can use the BIOS-level setting smart card on any computer system having smart card BIOS-level user configuration capability. The user inserts the smart card into a smart card receptor of the computer system, as appropriate, and the system is then caused to be booted up. Upon a boot up of the computer system, the BIOS includes a capability for obtaining the custom settings of the user from the smart card. The custom settings are then used by the computer system to override the computer system's current settings.

One example for illustrating a usage of the present embodiments may include a corporate environment in which a new secretarial staff person has been hired. In the computer system of a computer network of the corporation, network interface cards may require IRQ9, further which is needed to be set up in the BIOS of each computer system. The computer systems which come directly from the computer manufacturer however may not have IRQ9 as a default setting for the network interface card. Let's assume that the new secretary is presented with a new computer system. Instead of having the secretary go through a number of user manuals or special training, to learn how to access the BIOS setup screen to change the system configuration and set IRQ9 for the network interface to enable the computer system to make the network connection, the corporation can simply assign a special badge to the secretary. The special badge could include a prescribed BIOS level setting smart card. The smart card would contain the necessary BIOS level setting of IRQ9 to enable a network interface card connection. The smart card is inserted into the appropriate reader on the computer system and the system booted up. The secretarial staff person will then able to connect to be computer network without having to learn or be concerned about BIOS level settings. The present embodiment advantageously provides an ease of use of the given computer system to ensure the computer system is set to corporate prescribed BIOS level settings.

Further with respect to the present embodiments, a given corporation could have smart cards distributed to it's employees for use with the corporation's computer systems and for establishing uniform usage of the corporation's custom BIOS level settings. In addition to the corporation's custom BIOS level settings, individual computer users could store custom BIOS level settings on the smart card also, such as might be permitted by a particular corporation's computer policy.

The present embodiments advantageously enable a computer system user to easily configure the BIOS level settings of a computer system in a multi-user computer environment with the use of a prescribed BIOS level setting smart card. A computer system user would most likely not want to be spending valuable time resetting and reconfiguring a given computer system, possibly on the order of each day. The present embodiments thus advantageously enable computer system users to correctly reset, reconfigure, and/or customize any given computer system having a smart card BIOS level setting capability. Such an ability is highly useful in a multi-user computer system environment.

Exemplary implementations of the present embodiments may include the following. One example includes the use of a BIOS level password. If a first user sets a BIOS level password and does not disable the password setting, then a second user of the computer system will effectively be prevented from using the same. In another example, a computer system BIOS can be written to bypass the computer system BIOS level password if the BIOS were to detect the presence of a valid BIOS level setting smart card. For added security, the BIOS of the computer system could request the computer user to enter a personal identification number (PIN) upon the BIOS detecting the presence of a valid BIOS level setting smart card. The user would then need to enter a correct PIN to enable the BIOS to then bypass the computer system's BIOS level password. Other alternate implementations are possible.

The requirement for a computer user to have a working knowledge (i.e., knowhow) about BIOS level settings has been dramatically reduced and/or eliminated. The knowhow is advantageously shifted from the user and placed within the smart card. The computer system users need no longer be occupied with resetting and reconfiguring the BIOS level settings of each computer of a multi-user computer environment which the user uses.

With certain computer systems, user selectable BIOS level settings may include an ability to choose, for example, up to at least three places to boot from, further in a particular boot order. The places that a computer system may boot from can include a floppy diskette drive, a hard disk drive, a removable hard disk drive, a CD-ROM drive, a network, or other possible bootable device.

By using a smart card, a level of security is advantageously built-in. Smart cards are made to not give up their data except under very controlled circumstances. For example, a smart card may require the entering of a PIN. The smart card will take the PIN and determine whether or not the PIN is correct. The smart card provides only an indication of whether or not the PIN is correct or incorrect. The PIN data is already secure on be smart card. The smart card is thus more convenient than having to use some form of encryption for saving the BIOS level settings.

A network interface card (NIC) can be disabled or enabled through the use of BIOS level settings. For example, if it is desired to prevent unauthorized users from accessing a network through a NIC of a given computer system, then a smart card possessed by authorized users can be used for changing the BIOS level settings to enable the NIC. The computer system would thus normally be operable in a stand-alone mode until such time as the BIOS level setting for the NIC was enabled with the use of an authorized user's smart card.

Multiple levels of BIOS level setting configuration ability are also possible according to a particular computer system administration policy of a multi-user computer environment. A system administrator might possess a highest level of configuration ability smart card, whereas a non-manager computer user may possess a lowest level of configuration ability smart card.

With respect to the present embodiments and the BIOS level setting smart card, the BIOS firmware includes program code for interpreting the BIOS level setting configuration information which is stored on the smart card. The computer system further includes means for updating the smart card upon changes to the BIOS level settings. Updating of the smart card can be performed automatically or as prompted by the computer system. A computer user can simply insert a prescribed smart card into the appropriate reader of the computer system prior to power up (or reboot) to enable the desired BIOS level settings to take effect. The smart card may also include program code for use in the updating of BIOS level settings on the smart card. The program code for the BIOS firmware and the smart card may be written for performing functions as described and discussed herein using techniques known in the art.

Turning now to FIG. 2, the method 50 of implementing BIOS level settings via the smart card begins with the computer user inserting the smart card into the appropriate reader of the computer system and further including the computer system is powered ON (step 52). In step 54, a power on self test (POST) is executed. Subsequent to the POST, in step 56 a determination is made as to whether or not a valid smart card is detected. If not, then the process continues in step 58 with a processing of current BIOS level settings. Subsequent to step 58, the computer contains its booting operation according to the boot routine of the computer system (step 60).

In step 56, if a valid smart card is detected, then the process proceeds to step 62. In step 62, the computer user is requested to enter the user's PIN. In step 64, the smart card determines whether or not the entered PIN is correct. If incorrect, then the process continues with step 58 and current BIOS level settings are implemented. If the PIN is correct as determined in step 64, then the process continues with step 66. In step 66, for each BIOS level setting stored on a smart card, a respective current BIOS level setting is overridden. The overridden BIOS level settings from step 66 become the new current BIOS level settings to be processed in step 58. Steps 58 and 60 are then carried out as indicated above.

Turning now to FIG. 3, a method 70 of updating a user's smart card shall be discussed. Method 70 begins at step 72.

Step 72 may include prompting the computer user to insert the smart card into the reader in the event that the smart card has been removed subsequent to the initial computer system boot and a manual change to the BIOS level settings has been made. In step 74, a determination is made as to whether or not a valid smart card is detected and the computer system. If not, then the process proceeds to step 76. In step 76, the computer system operation returns to a prior operating program or application.

With reference still to FIG. 3, in step 74, if a valid smart card is detected in the computer system, then the process proceeds to step 78. Step 78 determines whether or not a change has occurred in the BIOS level settings during a current session with the computer user. Step 78 might also include an inquiry to the user asking the user if changes are to be saved. If the result of step 78 is that changes are not to be saved, then the process continues to step 76. However, if in step 78, the changes are to be saved, then the process advances to step 80. Step 80 includes updating the smart card with the respective changed current BIOS level settings, either as a whole or individually. Subsequent to step 80, the process continues at step 76, as previously discussed. FIG. 3 represents: one possible implementation for updating of the smart card. Other implementations may also be possible.

Another illustration includes a smart card having a BIOS level setting for booting the computer system from the hard drive in a modular bay of the computer system. In operation, the computer user would first ensure that the modular hard drive is inserted into the modular bay of the computer system. In addition, the smart card having the modular hard drive boot setting is inserted into the smart card reader of the computer system. The computer system can then be powered ON. The method of FIG. 2 is then carried out, where in step 66, the modular hard drive boot setting is caused to override the current system boot setting. In step 58, the BIOS level setting is acted upon such that, in the instant example, the computer system is caused to boot from the modular hard disk drive installed in the modular bay of the computer system.

As discussed above, the computer system can include any BIOS configurable device, for example, such as, a diskette drive, hard disk drive, removable hard disk drive, CD-ROM drive, network interface card (NIC), audio chip, sound card, etc. The BIOS configurable device may further include a chip on the computer system mother board, a card attached to a suitable computer system bus, a bus expansion card, a PCMCIA controller, or other externally connected BIOS configurable device.

The computer system may also include BIOS configurable devices which generate interrupt requests, IRQs. For instance, an audio sound card device generally requires the use of an interrupt or IRQ, wherein the specific IRQ is established with the use of a BIOS level setting. If a device of the computer system is not to be enabled for whatever reason, then the BIOS level settings may be used to hide the particular device, i.e., not enable the device. The computer's operating system would then not allocate an IRQ to the non-enabled device, nor give the non-enabled device any resources. In this manner, the resources, such as IRQs, are freed up to be used in other ways as may be necessary.

Further with respect to BIOS configurable devices and an audio sound card or chip, the sound card or chip may have both full duplex and half duplex capability. In the instance of a sound chip, the chip can be mounted on a mother board with the processor. For a sound card, the sound card can be attached to an appropriate bus of the computer system. For the full duplex capability, such as for a speaker phone application which allows simultaneous talking and listening, two IRQs are required. For the half duplex capability, one IRQ is required. As mentioned, the audio sound chip or card is a BIOS configurable device. The sound card can be easily configured for a desired use between multiple users as necessary with the use of the BIOS level setting smart card of the present disclosures. In some instances, full duplex mode may be desired. In other instances, half duplex mode maybe sufficient. Thus, by enabling half duplex mode when possible, an IRQ is freed up for use by another device of the computer system which may require an IRQ. More efficient usage of the computer system resources is thus accomplished.

In one embodiment, a first smart card may be loaded with a first default set of BIOS level configuration settings and a second smart card can be loaded with a second default set of BIOS level configuration settings. The first default set may be useful for a first group of users (first group) whereas the second default set may be useful for a second group of users (second group). The first default set of BIOS level settings and the second default set are thus different from each other. The first default set may further include a minimum of default BIOS level configuration settings and the second default set may include a greater number of default BIOS level configuration settings. A minimum number of default BIOS level configuration settings may include no settings. Each smart card further includes suitable code for use in updating the respective smart card in the event of user modified changes to the BIOS level settings.

Still further, the default set of BIOS level configuration settings on the smart card may be made the same as those of a particular computer system, for example, those settings as established at a time of manufacture of the computer system. The smart card could also be provided with a custom built-to-order computer system to enable a computer user to reset the original BIOS level settings on the custom built-to-order computer as needed or desired. The smart card implementations of the present disclosures are thus useful in a corporate environment for easily restoring and/or maintaining a uniformity of settings amongst multiple computers. In addition, the smart card implementations are useful for individual or home use environments. With builds-to-order manufacturing of a computer system, a customer decides which components to have installed in the customer's computer system. That is, given a customer order, in a built-to-order factory, the components selected/ordered by a customer are installed in the build-to-order computer system.

The embodiments of the present disclosure advantageously provide an improved system and method for providing BIOS-level user configuration in a multi-user computer system environment.

While the method and apparatus of the present disclosure have been particularly shown and described with reference to the various embodiments thereof, it will be understood by those skilled in the art that various changes in form and detail may be made therein without departing from the spirit and scope of the method and apparatus, as set forth in the following claims.

What is claimed is:

1. A computer system comprising:
   at least one processor;
   at least one memory, said at least one memory including operating system code;
   basic input output system (BIOS) firmware in the computer system, said BIOS firmware including a smart card BIOS level setting support feature;

a prescribed smart card useable with the computer system for activating the BIOS level setting support feature; and at least one BIOS configurable device, said BIOS configurable device subject to being configured by said at least one processor in response to the prescribed smart card actuation of the smart card BIOS level setting support feature.

2. The computer system of claim 1, further comprising:

a smart card reader for receiving the prescribed smart card, said smart card reader further for interfacing the prescribed smart card received therein with said at least one processor in an actuation of the smart card BIOS level setting support feature, said at least one processor for performing a BIOS level configuration setting of said at least one BIOS configurable device prior to a booting of the operating system code.

3. The computer system of claim 2, wherein said BIOS firmware further includes a user accessible BIOS configuration setup feature, the setup feature including user selectable BIOS level settings, and said at least one BIOS configurable device is configurable by said at least one processor in response to BIOS level settings selected by a user in accordance with the BIOS configuration setup feature.

4. The computer system of claim 3, further wherein the smart card BIOS level setting support feature includes instructions for enabling said at least one processor to perform an updating of the BIOS level settings on the prescribed smart card subsequent to a change in the BIOS level settings of said at least one BIOS configurable device by the user.

5. The computer system of claim 1, wherein said at least one BIOS configurable device may include at least one of the following selected from the group consisting of a diskette drive, a hard disk drive, a removable hard disk drive, a CD-ROM drive, a network interface card, an audio chip, a sound card, a PCMCIA controller, and a bus expansion card.

6. The computer system of claim 1, wherein said BIOS firmware includes a factory default set of BIOS level settings for use in establishing a default setting of said at least one BIOS configurable device.

7. The computer system of claim 6, wherein the prescribed smart card includes a default smart card set of BIOS level settings for use in establishing a default smart card setting of said at least one BIOS configurable device.

8. The computer system of claim 7, wherein the factory default set of BIOS level settings is the same as the smart card default set of BIOS level settings.

9. The computer system of claim 7, wherein the factory default set of BIOS level settings is different from the smart card default set of BIOS level settings.

10. The computer system of claim 1, wherein said BIOS firmware further includes a user accessible BIOS configuration setup feature, the setup feature including user selectable BIOS level settings, and said at least one BIOS configurable device is configurable by said at least one processor in response to BIOS level settings selected by a user in accordance with the BIOS configuration setup feature.

11. A computer system comprising:

at least one processor;

at least one memory, said at least one memory including operating system code;

basic input output system (BIOS) firmware in the computer system, said BIOS firmware including a smart card BIOS level setting support feature;

a prescribed smart card useable with the computer system for activating the BIOS level setting support feature;

at least one BIOS configurable device, said BIOS configurable device subject to being configured by said at least one processor in response to the prescribed smart card actuation of the smart card BIOS level setting support feature; and means for receiving the prescribed smart card, said smart card reader means further for interfacing the prescribed smart card received therein with said at least one processor in an actuation of the smart card BIOS level setting support feature, said at least one processor for performing a BIOS level configuration setting of said at least one BIOS configurable device prior to a booting of the operating system code.

12. The computer system of claim 11, wherein said at least one BIOS configurable device may include at least one of the following selected from the group consisting of a diskette drive, a hard disk drive, a removable hard disk drive, a CD-ROM drive, a network interface card, an audio chip, a sound card, a PCMCIA controller, and a bus expansion card.

13. The computer system of claim 11, wherein said BIOS firmware includes a factory default set of BIOS level settings for use in establishing a default setting of said at least one BIOS configurable device.

14. The computer system of claim 13, wherein the prescribed smart card includes a default smart card set of BIOS level settings for use in establishing a default smart card setting of said at least one BIOS configurable device.

15. The computer system of claim 14, wherein the factory default set of BIOS level settings is the same as the smart card default set of BIOS level settings.

16. The computer system of claim 14, wherein the factory default set of BIOS level settings is different from the smart card default set of BIOS level settings.

17. A method of implementing BIOS level configuration settings in a computer system comprising:

providing at least one processor;

providing at least one memory, the at least one memory including operating system code;

providing basic input output system (BIOS) firmware in the computer system, the BIOS firmware including a smart card BIOS level setting support feature;

providing a prescribed smart card useable with the computer system for activating the BIOS level setting support feature; and providing at least one BIOS configurable device, the BIOS configurable device subject to being configured by the at least one processor in response to the prescribed smart card actuation of the smart card BIOS level setting support feature.

18. The method of claim 17, further comprising:

providing a smart card reader for receiving the prescribed smart card, the smart card reader further for interfacing the prescribed smart card received therein with the at least one processor in an actuation of the smart card BIOS level setting support feature, the at least one processor for performing a BIOS level configuration setting of the at least one BIOS configurable device prior to a booting of the operating system code.

19. The method of claim 18, wherein the BIOS firmware further includes a user accessible BIOS configuration setup feature, the setup feature including user selectable BIOS level settings, and the at least one BIOS configurable device is configurable by the at least one processor in response to BIOS level settings selected by a user in accordance with the BIOS configuration setup feature.

20. The method of claim 19, further wherein the smart card BIOS level setting support feature includes instructions for enabling the at least one processor to perform an updating of the BIOS level settings on the prescribed smart card subsequent to a change in the BIOS level settings of the at least one BIOS configurable device by the user.

21. The method of claim 17, wherein the at least one BIOS configurable device may include at least one of the following selected from the group consisting of a diskette drive, a hard disk drive, a removable hard disk drive, a CD-ROM drive, a network interface card, an audio chip, a sound card, a PCMCIA controller, and a bus expansion card.

22. The method of claim 17, wherein the BIOS firmware includes a factory default set of BIOS level settings for use in establishing a default setting of the at least one BIOS configurable device.

23. The method of claim 22, wherein the prescribed smart card includes a default smart card set of BIOS level settings for use in establishing a default smart card setting of the at least one BIOS configurable device.

24. The method of claim 23, wherein the factory default set of BIOS level settings is the same as the smart card default set of BIOS level settings.

25. The method of claim 23, wherein the factory default set of BIOS level settings is different from the smart card default set of BIOS level settings.

26. The method of claim 17, wherein the BIOS firmware further includes a user accessible BIOS configuration setup feature, the setup feature including user selectable BIOS level settings, and the at least one BIOS configurable device is configurable by the at least one processor in response to BIOS level settings selected by a user in accordance with the BIOS configuration setup feature.

27. A method of implementing BIOS level configuration settings in a computer system comprising:

providing at least one processor;

providing at least one memory, the at least one memory including operating system code;

providing basic input output system (BIOS) firmware in the computer system, the BIOS firmware including a smart card BIOS level setting support feature;

providing a prescribed smart card useable with the computer system for activating the BIOS level setting support feature;

providing at least one BIOS configurable device, the BIOS configurable device subject to being configured by the at least one processor in response to the prescribed smart card actuation of the smart card BIOS level setting support feature; and providing means for receiving the prescribed smart card, the smart card reader means further for interfacing the prescribed smart card received therein with the at least one processor in an actuation of the smart card BIOS level setting support feature, the at least one processor for performing a BIOS level configuration setting of the at least one BIOS configurable device prior to a booting of the operating system code.

28. The method of claim 27, wherein the at least one BIOS configurable device may include at least one of the following selected from the group consisting of a diskette drive, a hard disk drive, a removable hard disk drive, a CD-ROM drive, a network interface card, an audio chip, a sound card, a PCMCIA controller, and a bus expansion card.

29. The method of claim 27, wherein the BIOS firmware includes a factory default set of BIOS level settings for use in establishing a default setting of the at least one BIOS configurable device.

30. The method of claim 29, wherein the prescribed smart card includes a default smart card set of BIOS level settings for use in establishing a default smart card setting of the at least one BIOS configurable device.

31. The method of claim 30, wherein the factory default set of BIOS level settings is the same as the smart card default set of BIOS level settings.

32. The method of claim 30, wherein the factory default set of BIOS level settings is different from the smart card default set of BIOS level settings.

* * * * *